United States Patent
Johnson

(10) Patent No.: US 12,494,628 B2
(45) Date of Patent: Dec. 9, 2025

(54) NON-FAN CEILING JUNCTION BOX

(71) Applicant: Hubbell Incorporated, Shelton, CT (US)

(72) Inventor: Steven James Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 232 days.

(21) Appl. No.: 18/051,851

(22) Filed: Nov. 1, 2022

(65) Prior Publication Data

US 2023/0138590 A1   May 4, 2023

Related U.S. Application Data

(60) Provisional application No. 63/274,336, filed on Nov. 1, 2021.

(51) Int. Cl.
```
H02G 3/16      (2006.01)
F21V 21/03     (2006.01)
H02G 3/20      (2006.01)
```

(52) U.S. Cl.
CPC .............. *H02G 3/16* (2013.01); *F21V 21/03* (2013.01)

(58) Field of Classification Search
CPC ............ H02G 3/18; H02G 3/20; F21V 21/03
See application file for complete search history.

(56) References Cited

U.S. PATENT DOCUMENTS

| | | | | |
|---|---|---|---|---|
| 5,106,314 A | * | 4/1992 | Bael | H01R 13/443 174/67 |
| 5,844,167 A | * | 12/1998 | Zekowski | H02G 3/20 174/377 |
| 6,146,191 A | * | 11/2000 | Kerr, Jr. | H02G 3/123 439/537 |
| 6,799,982 B2 | * | 10/2004 | Kerr, Jr. | H02G 3/20 439/537 |
| 8,839,511 B2 | * | 9/2014 | Krupa | F21V 19/00 29/854 |
| 2006/0108137 A1 | * | 5/2006 | Smith | H01R 33/46 174/50 |
| 2007/0205011 A1 | * | 9/2007 | Dinh | H02G 3/20 174/50 |
| 2021/0344151 A1 | * | 11/2021 | Fleming | H02G 3/083 |

* cited by examiner

*Primary Examiner* — Timothy J Thompson
*Assistant Examiner* — Amol H Patel
(74) *Attorney, Agent, or Firm* — Ruggiero McAllister & McMahon LLC; Edward L McMahon

(57) ABSTRACT

A non-fan rated ceiling junction box is provided. The junction box includes a main body, an outlet, and fasteners that connect the outlet in the main body. The fasteners have a feature selected from a group consisting of: non-removable, removable only using a non-standard tool, inaccessible without a special tool, positioned on the main body so as to be inaccessible when installed, and any combinations thereof.

11 Claims, 1 Drawing Sheet

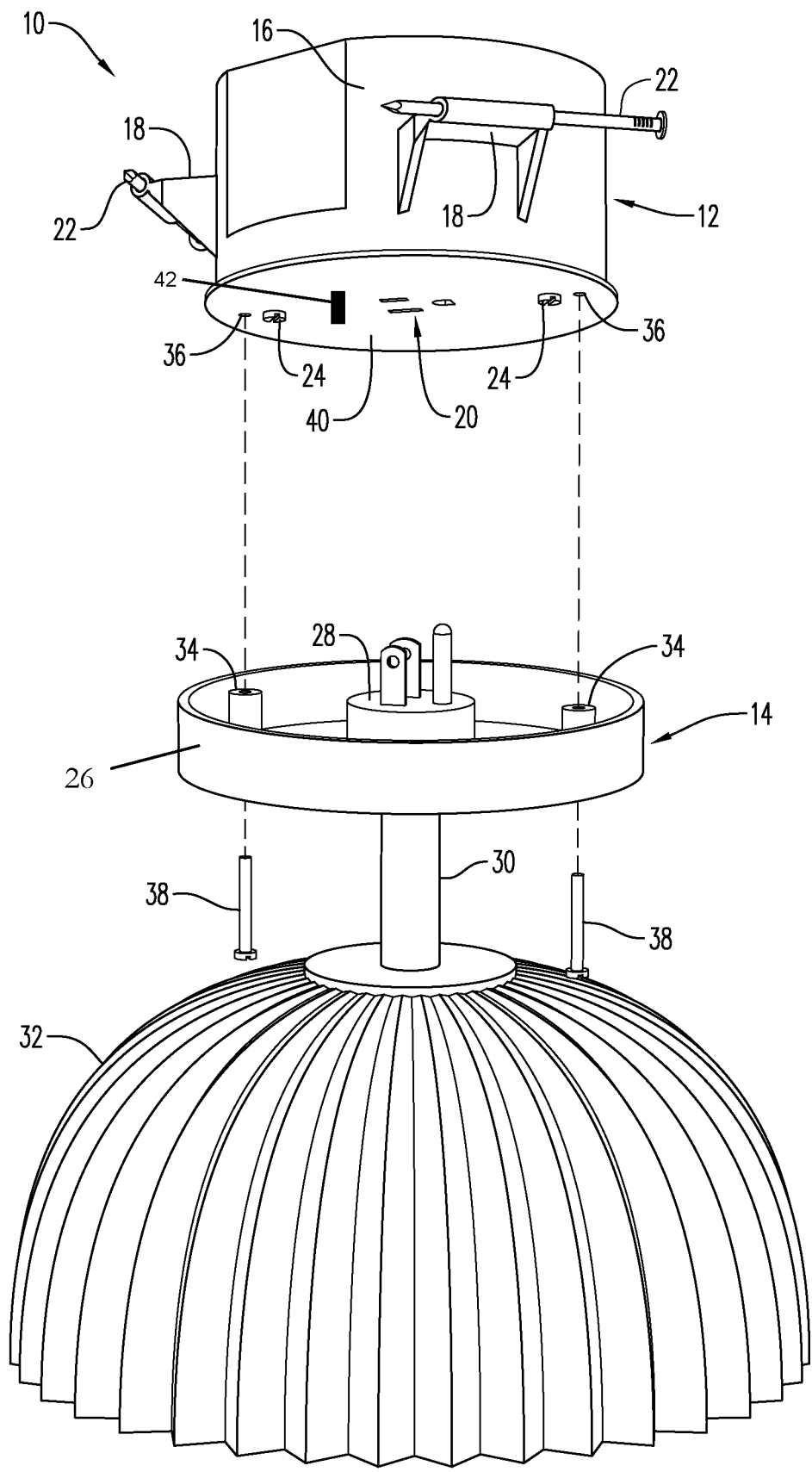

NON-FAN CEILING JUNCTION BOX

CROSS REFERENCE TO RELATED APPLICATIONS

This application claims the benefit of U.S. Application 63/274,336 filed Nov. 1, 2021, the entire contents of which are incorporated by reference herein.

BACKGROUND

1. Field of the Invention

The present disclosure is related to junction boxes. More particularly, the present disclosure is related to non-fan rated ceiling junction box assemblies, as well as junction boxes and electrical devices for use with such assemblies.

2. Description of Related Art

Electrical junction boxes are typically installed in walls and ceilings. Electrical conductors can be run from the service panel through the walls and/or ceilings so as to terminate in a junction box. An electrical device can be operatively coupled with the electrical conductor in the junction box in a known manner.

When installed in a ceiling, the junction box can be exposed to differing levels of forces imparted by the electoral device.

Some ceiling junction boxes are configured for support of electrical devices that generally impart only a vertical load and/or static load to the junction box—namely impart only light-duty forces to the junction box. These junction boxes are often secured to only one ceiling joist. For ease of discussion, this type of junction box is referred to herein as "light-duty" and/or "non-fan rated".

Other ceiling junction boxes are configured for support of electrical devices imparting heavier vertical loads and/or imparting dynamic forces such as rotational forces to the junction box. For example, these junction boxes can be operatively connected to electrical devices such as, but not limited to, ceiling fans, combined fan/lighting devices, high weight chandeliers, and other high load imparting devices. These junction boxes are often secured to two adjoining ceiling joists. For ease of discussion, this type of junction box is referred to herein "heavy-duty" and/or "fan rated"

The fan-rated ceiling junction boxes are typically more expensive to purchase and install then the non-fan rated ceiling junction boxes. Thus, it is common for builders to minimize construction costs by installing only the less expensive non-fan rated ceiling junction boxes—in combination with an electrical device that imparts light-duty forces.

Home owners looking to upgrade from the builder installed light-duty electrical device to a heavier electrical device such as a chandelier and/or to a ceiling fan can inadvertently install these devices onto the "light-duty" and/or "non-fan rated" ceiling junction box.

Accordingly, it has been determined by the present disclosure that there is a need for non-fan rated ceiling junction boxes and related assemblies that overcome, alleviate, and/or mitigate one or more of the aforementioned and other deleterious effects of the prior art.

SUMMARY

A non-fan rated ceiling junction box is provided. The junction box includes a main body, an outlet, and fasteners that connect the outlet in the main body. The fasteners have a feature selected from a group consisting of: non-removable, removable only using a non-standard tool, inaccessible without a special tool, positioned on the main body so as to be inaccessible when installed, and any combinations thereof.

An electrical light fixture is also provided. The fixture includes a light fixture, a male plug, a conduit coupling the male plug to the light fixture, and a cover portion. The cover portion is on the conduit between the light fixture and the male plug. The cover portion has one or more fasteners that connect the cover portion to a ceiling junction box with the plug remaining between the cover and the ceiling junction box.

A non-fan rated ceiling junction box assembly is provided. The assembly includes a non-fan rated ceiling junction box and a light fixture. The junction box has an outlet secured therein by first fasteners. The light fixture has a conduit operatively coupling a male plug to the light fixture and has a cover portion. The cover portion is positioned on the conduit between the light fixture and the male plug. The cover portion has second fasteners that connect the cover portion to the non-fan rated ceiling junction box while the plug is operatively coupled in the outlet.

In some embodiments either alone or together with any one or more of the aforementioned and/or after-mentioned embodiments, the first fasteners have a feature selected from a group consisting of: non-removability, removable only using a non-standard tool, inaccessible without a special tool, positioned on the main body so as to be inaccessible when installed, and any combinations thereof.

The above-described and other features and advantages of the present disclosure will be appreciated and understood by those skilled in the art from the following detailed description, drawings, and appended claims.

DESCRIPTION OF THE DRAWINGS

The sole FIGURE is a perspective view of an exemplary embodiment of a non-fan rated ceiling junction box assembly according to the present disclosure.

DETAILED DESCRIPTION

The sole FIGURE illustrates an exemplary embodiment of a non-fan rated ceiling junction box assembly according to the present disclosure, which is generally referred to by reference numeral 10. Assembly 10 includes a non-fan rated ceiling junction box 12 and an electrical device 14. Advantageously, assembly 10 is specifically configured to prevent installation of heavy-duty electrical devices in the manner discussed in detail below.

Box 12 has a main body 16, one or more mounts 18, and an electrical outlet 20. Main body 16 can have any desired shape or size as known in the art. In the illustrated embodiment, box 12 is illustrated as a molded plastic member having body 16 and mounts 18 formed as unitary members to one another. Of course, it is contemplated by the present disclosure for box 12 to have any known configuration. Further, box 12 can be made of any desired material including, but not limited to, polymers, metals, and combinations thereof.

Box 12 can be secured to a joist (not shown) using mounts 18 and first fasteners 22, which are illustrated as nails. Of course, it is contemplated for box 12 to be secured to the joist or other structural member in any desired manner. In the illustrated embodiments, mounts 18 are shown as shoulders extending from main body 16. However, it is contemplated by the present disclosure for mounts 18 to be as simple as openings in a wall of main body 16 that receive first fasteners 22.

Outlet 20 is positioned in box 12 and secured on position one or more second fasteners 24. When installed, and operatively coupled to an electrical conductor (not shown) in a known manner.

Electrical device 14 includes a cover portion 26, a male plug 28, and a conduit 30 operatively coupled to a light fixture 32 (shown schematically). Cover 26 and plug 28 are sized, positioned, and configured so that the plug can be operatively coupled to outlet 20 with cover 26 secured to box 12.

Cover 26 includes one or more openings 34 that can be placed into registration with one or more openings 36 in box 12 so as to receive one or more third fasteners 38. In the illustrated embodiment, openings 36 are positioned in a face 40 of outlet 20. Of course, it is contemplated by the present disclosure for openings 36 to be defined in any portion of box 12 such as in main body 16, mounts 18, or outlet 20.

In this manner, assembly 10 is configured—through the configuration of box 12 having outlet 20 and electrical device 14 having plug 28—to prevent installation of heavy-duty electrical devices by the typical homeowner. For example, if the homeowner were to purchase another electrical device (i.e., fan, chandelier, or even another light fixture) that device would lack plug 28 and would require more extensive work/modification in order to be installed.

In some embodiments, assembly 10 is configured so that outlet 20 can be secured in box 12 in a manner that makes removal difficult for the typical homeowner and/or prevents connection of electrical devices other than those having plug 28.

In one embodiment, assembly 10 can be provided with second fasteners 24 that require a special tool to allow removal of outlet 20 from box 12.

In another embodiment, assembly 10 can be provided with second fasteners 24 that are non-removable without damage to or destruction of the second fasteners 24 and/or outlet 20.

In yet another embodiment, assembly 10 can be configured so that second fasteners 24 are hidden by or inaccessible through the material of the ceiling (e.g., drywall) that is installed after positioning of the outlet in the box.

In still other embodiments, assembly 10 can be configured so that outlet 20 is secured in box 12 using a mechanical connection that is inaccessible without a special tool—or where the mechanical connection is frangible such that removal of outlet 20 prevents reassembly of box and/or outlet.

In further other embodiments, assembly 10 is configured so that box 12 lacks any threaded bosses that are typically required for installation of other electrical devices.

Regardless of the type or manner of connection between box 12 and outlet 20, the means of connection is designed to at a minimum increase the difficulty with which outlet 20 is removed from the box, but can also entirely prevent removal or eliminate any means from box 12 that allows connection with other electrical devices.

Assembly 10 can be configured so that, when outlet 20 and plug 28 are connected, the connection therebetween can support the weight of electrical device 14 prior to securement of cover 26 to box 12 by third fasteners 38. In this manner, assembly 10 is configured to ease the assembly of box 12 and electrical device 14 by allowing the user to first insert plug 28 into outlet 20—then connect cover 26 using third fasteners 38 without having to deal with supporting electrical device 14 while positioning cover 26, aligning or registering openings 34, 36, and installing third fasteners 38.

In some embodiments, outlet 20 and plug 28 can form a twist connection that is sufficient to support the weight of electrical device 14. In other embodiments, face 40 of outlet 20 can have a member 42 that is movable with respect to the outlet so that, once plug 28 is installed in outlet 20, the member 42 can be moved to interfere with the removal of the plug from the outlet.

Electrical device 14 can be configured so that cover 26 is movable along conduit 30 and/or rotatable about the conduit. In this manner, cover 26 can be moved away from plug 28 to allow clearance to install the plug into outlet 20 without interference by the cover. Once plug 28 is installed in outlet 20, cover 26 can be moved along conduit 30 towards box 12 and the cover can be rotated about the conduit to align or register openings 34 on the cover to openings 36 on box 12 to allow installation of third fasteners 38.

In other embodiments, assembly 10 can be configured so that cover 26 forms a mechanical connection directly to box 12. Here, openings 34, 36 and third fasteners 38 can be eliminated—and replaced with a mechanical connection (not shown) on inside of cover 26 that mates with a corresponding connection (also not shown) on box 12. Suitable mechanical connections contemplated by the present disclosure include, but are not limited to, corresponding threads on the interior of cover 26 and exterior of main body 16, movable tabs on the interior of cover 26 and corresponding slots on the exterior of box 12 (i.e., main body 16 and/or cover 40), and others.

It has also been found that assembly 10 affords additional flexibility and utility during construction and personalization of the user space. For example in traditional construction with prior art ceiling boxes and light fixtures, the electrician first installs the junction box and runs the electrical conduit to the junction box, followed by installation of drywall over the junction box to close the ceiling, followed by painting, with the electrician having to return to the site to install the light fixture. Advantageously, assembly 10 allows the electrician to install junction box 12 and wire outlet 20 to the electrical conduit. Final installation of electrical device 14 can be handled by trades outer than the electrician as it merely requires insertion of plug 28 into outlet 20.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST non-fan rated ceiling junction box assembly 10
non-fan rated ceiling junction box 12 electrical device 14
main body 16
mounts 18
electrical outlet 20
first fasteners 22
second fasteners 24
cover portion 26
male plug 28
conduit 30
light fixture 32
cover openings 34
box openings 36
third fasteners 38
outlet face 40

What is claimed is:

1. A non-fan rated ceiling junction box, comprising:
a main body;
an outlet having a face; and
one or more fasteners configured to connect the face to the main body such that the outlet is configured to receive a plug of an electrical device, wherein the one or more fasteners have a feature selected from a group consisting of: non-removable, removable only using a non-standard tool, inaccessible without a special tool, positioned on the main body so as to be inaccessible when installed, and any combinations thereof,
wherein the face comprises a member that is movable with respect to the outlet so that, once a plug of an electrical device is installed in the outlet, the member can be moved to interfere with the removal of the plug from the outlet.

2. A non-fan rated ceiling junction box assembly, comprising:
a non-fan rated ceiling junction box;
an outlet consisting of a face;
a first fastener securing the face to the non-fan rated ceiling junction box, wherein the first fastener is configured to prevent removal of the outlet from the non-fan rated ceiling junction box;
an electrical device having a conduit operatively coupling a male plug to the electrical device;
a cover portion movably positioned on the conduit between the electrical device and the male plug,
wherein the cover portion has a second fastener configured to connect the cover portion to the non-fan rated ceiling junction box while the male plug is operatively coupled in the outlet.

3. The assembly of claim 2, wherein the non-fan rated ceiling junction box comprises a mount depending therefrom, the non-fan rated ceiling junction box being securable to a joist by a third fastener received by the mount.

4. The assembly of claim 2, wherein the outlet and the male plug form a twist plug that can support the weight of the electrical device.

5. The assembly of claim 2, wherein the electrical device is a light fixture.

6. The assembly of claim 2, wherein the cover is movable along the conduit and/or rotatable about the conduit.

7. The assembly of claim 2, wherein the first fastener is inaccessible when the outlet is secured in the non-fan rated ceiling junction box.

8. The assembly of claim 2, wherein the first fastener is not removable.

9. The assembly of claim 2, wherein the first fastener is inaccessible without a special tool.

10. The assembly of claim 2, wherein the first fastener is removable only using a non-standard tool.

11. The assembly of claim 2, wherein the face has a member that is movable with respect to the outlet so that, once the male plug is operatively coupled in the outlet, the member is movable to interfere with the removal of the male plug from the outlet.

* * * * *